(12) United States Patent
Dodds et al.

(10) Patent No.: US 7,385,932 B2
(45) Date of Patent: Jun. 10, 2008

(54) WIDEBAND FREQUENCY DOMAIN REFLECTOMETRY TO DETERMINE THE NATURE AND LOCATION OF SUBSCRIBER LINE FAULTS

(75) Inventors: David E. Dodds, Saskatoon (CA); Bernardo Celaya, Saskatoon (CA); Terence Monteith, Saskatoon (CA)

(73) Assignee: Telecommunications Research Laboratory, Edmonton, Alberta (CA)

( * ) Notice: Subject to any disclaimer, the term of this patent is extended or adjusted under 35 U.S.C. 154(b) by 738 days.

(21) Appl. No.: 10/832,472

(22) Filed: Apr. 27, 2004

(65) Prior Publication Data

US 2005/0238037 A1    Oct. 27, 2005

(51) Int. Cl.
*H04J 1/16* (2006.01)
*H04J 3/14* (2006.01)

(52) U.S. Cl. .................. 370/248; 370/242; 709/14.01; 709/22.02

(58) Field of Classification Search ...................... None
See application file for complete search history.

(56) References Cited

U.S. PATENT DOCUMENTS

| | | | |
|---|---|---|---|
| 3,751,606 A | 8/1973 | Kaiser, Jr. | |
| 3,904,839 A | 9/1975 | Peoples | |
| 4,218,656 A * | 8/1980 | Lazarus | 455/59 |
| 5,825,846 A * | 10/1998 | Aach et al. | 378/98 |
| 6,327,534 B1* | 12/2001 | Levanon et al. | 701/215 |
| 6,466,649 B1 | 10/2002 | Walance et al. | |
| 6,668,041 B2 | 12/2003 | Kamali et al. | |
| 6,724,344 B1* | 4/2004 | Stockmaster et al. | 342/377 |
| 2002/0146095 A1 | 10/2002 | Peoples | |
| 2004/0062361 A1 | 4/2004 | Kamali et al. | |

* cited by examiner

*Primary Examiner*—Ronald Abelson
(74) *Attorney, Agent, or Firm*—Adrian D. Battison; Michael R. Williams; Ryan W. Dupuis (57) ABSTRACT

A technique for estimating distances and the nature of irregularities and faults on a telephone subscriber line is disclosed. Reflected test signals are measured as a function of frequency. The measurements are compensated for variable propagation velocity and variable line attenuation and then weighted before transformation with the Fourier transform. The amplitude and phase of peaks in the spectral domain identify the distances to the irregularities and the magnitude and phase angle of the reflection coefficients.

15 Claims, 6 Drawing Sheets

Instrument Block Diagram

Fig. 1 – Instrument Block Diagram

Fig. 2 – Double balanced wideband hybrid coupler

Fig. 3 – Subtraction of Stored Baseline Trace

Fig. 4 – Plot and result of warping function

Fig. 5 – Improved Resolution with Warping

Fig. 6 – Extrapolation of the trace down to zero hertz.

Fig. 8 – Measurement of multiple bridge taps.

a)
Spectral Analysis
Without Windowing b)
Spectral Analysis
with
Blackman Window Fig. 7 – Blackman weighting reduces "Spectral Leakage"

WIDEBAND FREQUENCY DOMAIN REFLECTOMETRY TO DETERMINE THE NATURE AND LOCATION OF SUBSCRIBER LINE FAULTS

This invention relates to the field of digital subscriber line communication and, in particular, to determining the composition of a subscriber line from frequency domain measurements at one end of the line which may be used for the purpose of qualifying the line for DSL transmission.

The methods in this invention can also be used in other fields particularly for the characterization of materials, systems and devices through the use of acoustic, electrical, electromagnetic or other waves in a lossy, dispersive medium. Specific areas of application include vibrational analysis of structures and devices; radar, ultrasonic and seismic imaging; characterization of electrical power, radio frequency, microwave and optical transmission lines.

BACKGROUND OF THE INVENTION

With the widespread deployment DSL (Digital Subscriber Line) transmission for Internet access, there is considerable interest in qualifying candidate telephone lines for high-speed digital transmission. A telephone line is known in the industry as a subscriber loop and it connects a telephone customer to a local switching center known as a central office (CO). The subscriber loop is typically composed of 26 gauge cable but it may contain sections of 24 or 22 gauge cable when there is need to avoid excessive attenuation of the voice signal. Operating practices of telephone service providers have typically resulted in one or more bridge taps near the customer end of the subscriber loop. These bridge taps are open circuit stubs (branches) connected in parallel with the main transmission line and their purpose is to provide flexibility for adding and removing station sets as service demand changes. Bridge taps are a significant impediment to high-speed digital transmission.

Another impediment to high-speed digital transmission is the insertion of loading coils. These 88 mH coils are connected in series with the line at regular intervals and reduce voice frequency attenuation by almost one-half. Loading coils are found on subscriber lines that are longer than about 4 km. These coils, together with the capacitance of the transmission line, form a low pass filter that eliminates the higher frequencies required for high-speed digital transmission.

The maximum transmission range of DSL modems is typically specified at 5.5 km and this would normally allow more than 95% of telephone customers to obtain high-speed Internet access. However, telephone service providers are reluctant to offer high-speed DSL service to customers with loops longer than 4 km since some loop structures may prevent transmission of a satisfactory DSL signal. Consequently, some 30-40% of potential customers (those beyond 4 km) are denied service. Accordingly, there is need to test these long loops to see if they might qualify for future provision of DSL service.

It is desirable to make measurements at the central office or possibly a field cabinet where several hundred -lines are connected to trunk cables. From these measurements it is possible to estimate the structure of a subscriber loop and, based on the estimated loop configuration, it is then possible to estimate the DSL transmission characteristics. It is particularly desirable to conduct these measurements using a single-ended approach at the central office so that the tests can be automated.

One single-ended test method uses a time domain reflectometer (TDR) instrument. A pulse is transmitted and the composition of the loop is estimated using identifiable characteristics in the echo response of the loop. This is a well-established method and there are several commercial test instruments based on this method. A problem with this method is the reduced resolution at long distances caused by spreading of the echo pulses A second single-ended method, and the subject of our invention, measures the return signal over a wide range of transmitted sinusoidal frequencies. This approach is generally referred to as the frequency domain or swept-frequency approach and our instrument will be henceforward referred to as a wideband frequency domain reflectometer (W-FDR). One advantage of the W-FDR method is improved resolution and the ability to discern structural discontinuities that are closely spaced.

Reference is made to the following prior art documents which show arrangements which are relevant to the methods Claimed herein, the disclosures of which are all incorporated herein by reference:

G. J. Erker, D. E. Dodds and W. Krzymien, 1995. "ISDN Loop Extension using a Mid-Span Amplifier", International Journal of Communication Systems, May-June, Vol. 8, No. 3, pp. 219-224.

U.S. Pat. No. 3,751,606 (Kaiser) issued Aug. $7^{th}$ 1973, U.S. Pat. No. 3,904,830 (Peoples) issued Sep. $9^{th}$ 1975 and pending U.S. application 2002/0146095 (Peoples) published Oct. $10^{th}$ 2002 all assigned to Bell Telephone Labs in which faults are detected by a frequency-domain detection system.

Also in pending U.S. patent application 2004/0062361 (Kamali et al) published Apr. $1^{st}$ 2004 is disclosed further developments of this same technique.

These patents thus show a method including the following steps:

inputting into one end of the transmission line a sinusoidal signal varied over a range of frequencies;

separating a reflected return signal from the transmitted signal;

and measuring the portion of the reflected signal that is in-phase with the transmitted signal as a function-of frequency applied at said one end to form a "trace", and where the Fourier transform is used to generate a spectral analysis of the measured in-phase return signal versus frequency;

and where distances to the irregularities are estimated from the spectral position of peaks in the spectral analysis.

SUMMARY OF THE INVENTION

It is one object of the present invention to provide an enhancement of the above method.

According to a first aspect of the present invention there is provided a method for analyzing irregularities on a transmission line comprising:

inputting into one end of the transmission line a sinusoidal signal varied over a range of frequencies;

separating a reflected return signal from the transmitted signal;

and measuring the portion of the reflected signal that is in-phase with the transmitted signal as a function of frequency applied at said one end to form a "trace";

where the reflected signal is separated from the transmit signal through a doubly balanced hybrid coupler;

and where the in-phase component of the reflected signal is extracted by a mixer;

and where the Fourier transform is used to generate a spectral analysis of the measured in-phase return signal versus frequency;

and where distances to the irregularities are estimated from the spectral position of peaks in the spectral analysis.

Preferably the hybrid coupler is first connected to an ideal, terminated line to record a residual in-phase return signal measurement that results from small imbalances in the hybrid coupler and where this residual measurement is subtracted form all further measurements with that hybrid coupler.

According to a second aspect of the present invention there is provided a method for analyzing irregularities on a transmission line comprising:

inputting into one end of the transmission line a sinusoidal signal varied over a range of frequencies;

separating a reflected return signal from the transmitted signal;

and measuring the portion of the reflected signal that is in-phase with the transmitted signal as a function of frequency applied at said one end to form a "trace", compensating the resulting trace based on the propagation velocity in the line to yield a measurement of in-phase reflection amplitude as a function of inverse wavelength;

and using the Fourier transform to generate a spectral analysis of the compensated measurement where the positions of peaks in the spectral analysis are used to estimate the distances to irregularities.

According to a third aspect of the present invention there is provided a method for analyzing irregularities on a transmission line comprising:

inputting into one end of the transmission line a sinusoidal signal varied over a range of frequencies;

separating a reflected return signal from the transmitted signal;

and measuring the portion of the reflected signal that is in-phase with the transmitted signal as a function of frequency applied at said one end to form a "trace", where measured trace results are extrapolated from the lowest frequency of measurement downward to zero Hz;

and then using the Fourier transform to generate a spectral analysis of the extrapolated measurement;

and using the positions of peaks in the spectral analysis to estimate the distances to irregularities;

and using the phase angles in the spectral analysis to estimate the phase angle in the reflections;

and using the phase angle to thus estimate the nature of the irregularity that caused the reflection.

According to a fourth aspect of the present invention there is provided a method for analyzing irregularities on a transmission line comprising:

inputting into one end of the transmission line a sinusoidal signal varied over a range of frequencies;

separating a reflected return signal from the transmitted signal;

and measuring the portion of the reflected signal that is in-phase with the transmitted signal as a function of frequency applied at said one end to form a "trace";

and then using the Fourier transform to generate a spectral analysis of the measurement;

and using the positions of peaks in the spectral analysis to estimate the distances to irregularities;

where measured trace results are weighted using a window function so that, when using the Fourier transform to generate a-spectral analysis, there is a significant reduction in the spurious responses that correspond to distances where there are no irregularities.

Preferably the window function is a Blackman window function.

According to a fifth aspect of the present invention there is provided a method for analyzing closely spaced irregularities-on a transmission line comprising:

inputting into one end of the transmission line a sinusoidal signal varied over a range of frequencies;

separating a reflected return signal from the transmitted signal;

and measuring the portion of the reflected signal that is in-phase with the transmitted signal as a function of frequency applied at said one end to form a "trace";

and then using the Fourier transform to generate a spectral analysis of the measurement;

and using the positions of peaks in the spectral analysis to estimate the distances to irregularities;

and, to compensate for attenuation that increases with measurement frequency, gain is applied that increases exponentially with frequency as is appropriate to the line length to the closely spaced irregularities so that, when using the Fourier transform in un-windowed mode: to generate a spectral analysis, high spectral resolution is attained.

According to a sixth aspect of the present invention there is provided a method for analyzing irregularities on a transmission line comprising:

inputting into one end of the transmission line a sinusoidal signal varied over a range of frequencies;

separating a reflected return signal from the transmitted signal;

and measuring the portion of the reflected signal that is in-phase with the transmitted signal as a function of frequency applied at said one end to form a "trace";

and then using the Fourier transform to generate a spectral analysis of the measurement;

and using the positions of peaks in the spectral analysis to estimate the distances to irregularities;

and, to improve resolution when using the Fourier transform, the reflected signal measurement is first extrapolated to zero hertz and then a reversed version of the extrapolated measurement trace is pre-pended to the extrapolated measurement trace so that the length of the extrapolated measured trace is increased by a factor of two and thereby improves the resolution of the spectral output.

According to a seventh aspect of the present invention there is provided a method for analyzing irregularities on a transmission line comprising:

inputting into one end of the transmission line a sinusoidal signal varied over a range of frequencies;

separating a reflected return signal from the transmitted signal;

and measuring the portion of the reflected signal that is in-phase with the transmitted signal as a function of frequency applied at said one end to form a "trace";

and then using the Fourier transform to generate a spectral analysis of the measurement;

and using the positions of peaks in the spectral analysis to estimate the distances to irregularities;

where the spectral analysis results are multiplied by a gain that increases with increasing distance so as to compensate for line attenuation that increases with increasing distance.

According to an eighth aspect of the invention there is provided a method for analyzing irregularities on a transmission line comprising:

inputting into one end of the transmission line a sinusoidal signal varied over a range of frequencies;

separating a reflected return signal from the transmitted signal;

and measuring the portion of the reflected signal that is in-phase with the transmitted signal as a function of frequency applied at said one end to form a trace, and then using the Fourier transform to generate a spectral analysis of the measurement;

and using the positions of peaks in the spectral analysis to estimate the distances to irregularities;

and, to compensate for attenuation that increases with measurement frequency, gain is applied to the trace that increases exponentially with frequency as is appropriate to the length of a section of line where the line length is divided into two or more sections and using the Fourier transform to generate a spectral analysis for each compensated trace corresponding to each section of the line length and combining the two or more spectral outputs into a single spectral output where the combining is a blend of the two or more spectral outputs and where the blending ratios are adapted with distance in the spectral output.

Thus the arrangement described in more detail hereinafter is for estimating distances to and types of irregularities on a subscriber loop. The method includes: (a) measuring from one end, the "trace" which is the reflected signal response over a range of sinusoidal frequency; (b) separating the in-phase return signal trace from the transmitted signal through the use of a doubly balanced hybrid coupler, a multiplier and stored baseline compensation (c) separately processing measurements in the voice frequency range to observe behavior such as resonances caused by loading coils; (d) warping the horizontal axis of the trace, so as to compensate for variation in propagation velocity of the transmission line, (e) pre-pending zero values to the trace from the minimum measured frequency down to zero hertz for the purpose of calculating phase angle; (f) weighting the extended trace with a Blackman or other appropriate window function to minimize spurious results otherwise known as "spectral leakage"; (g) generating a spectral analysis of the weighted trace wherein the estimated distances to multiple irregularities correspond to peaks in the spectral analysis and the magnitude and phase angle associated with each peak relate to the magnitude and angle of the reflection factor at that irregularity; (h) for the purpose of increasing resolution over a relatively small range of distances, applying an exponentially increasing amplification to the trace wherein the rate of increase with increasing measurement frequency is proportional to the distance range being evaluated; (i) for the purpose of increasing resolution when the reflection coefficients are not complex, the trace data is mirrored about the zero Hz axis; and (j) for the purpose of presenting a more understandable result, the spectral output can be amplified in proportion to distance to compensate for loss in the transmission line.

BRIEF DESCRIPTION OF THE DRAWINGS

One embodiment of the invention will now be described in conjunction with the accompanying drawings in which.

DETAILED DESCRIPTION

Part a)

Figure 1:
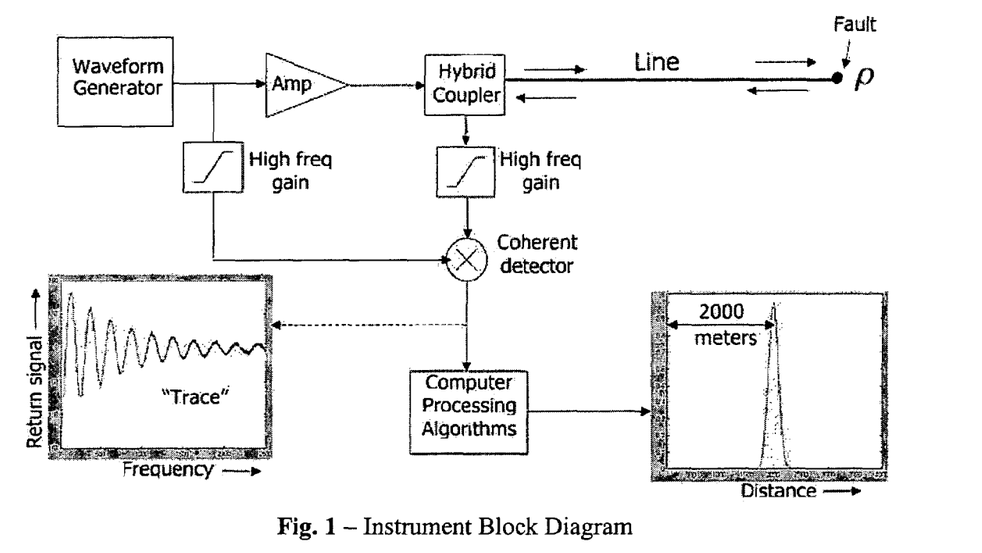
FIG. 1 is an Instrument Block Diagram showing one embodiment of the invention.

With reference to the instrument block diagram in FIG. 1, a sinusoidal voltage is applied to the subscriber line under test. A portion of this sinusoidal voltage is reflected back to the measurement end and is separated from the transmitted signal by the hybrid coupler and then amplified.

The in-phase component of the return signal is extracted through multiplication by the transmitted signal. Prior to the multiplier, the return signal and the transmitted signal undergo amplification with a gain that increases with increasing frequency. The purpose of increasing receiver sensitivity at higher frequency is to partially compensate for the increased transmission line loss at higher frequency and this avoids excessive quantization error when the return signal is digitized for computer processing.

For a simple subscriber line with an open circuit at the end, the in-phase part of the return signal varies sinusoidally with frequency. The resulting "trace" has the form of an exponentially decaying sinusoid. Along the frequency axis of the trace, the rate of oscillation is more rapid when the line length is longer. The Fast Fourier Transform can be used to obtain the spectral content of the trace and the peak in the transform output is proportional to the distance to the reflection.

Part b)

Figure 2:
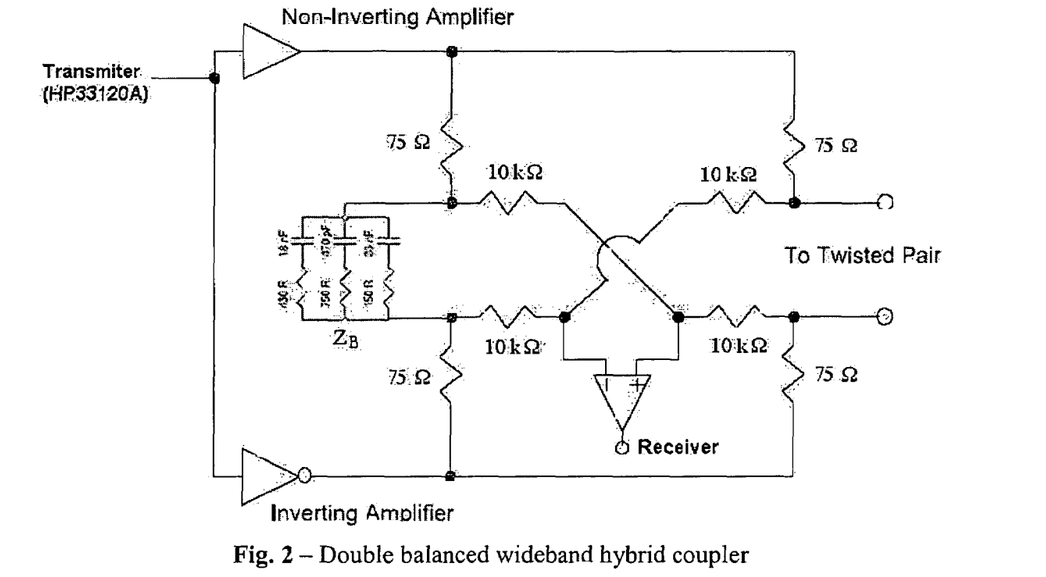
FIG. 2 is a schematic diagram of the Double balanced wideband hybrid coupler of FIG. 1.

The double balanced hybrid coupler provides longitudinal balance (due to symmetry) and also bridge balance due to the matching of the impedance $Z_B$ to the line impedance over a wide range of frequencies. In our embodiment illustrated in FIG. 2, the balance impedance $Z_B$ has three branches and its impedance closely matches that of 26 gauge cable over the frequency range 10 kHz to 500 kHz. The small mismatch between the two impedances results in a residual measurement; this is discussed later.

Figure 3:
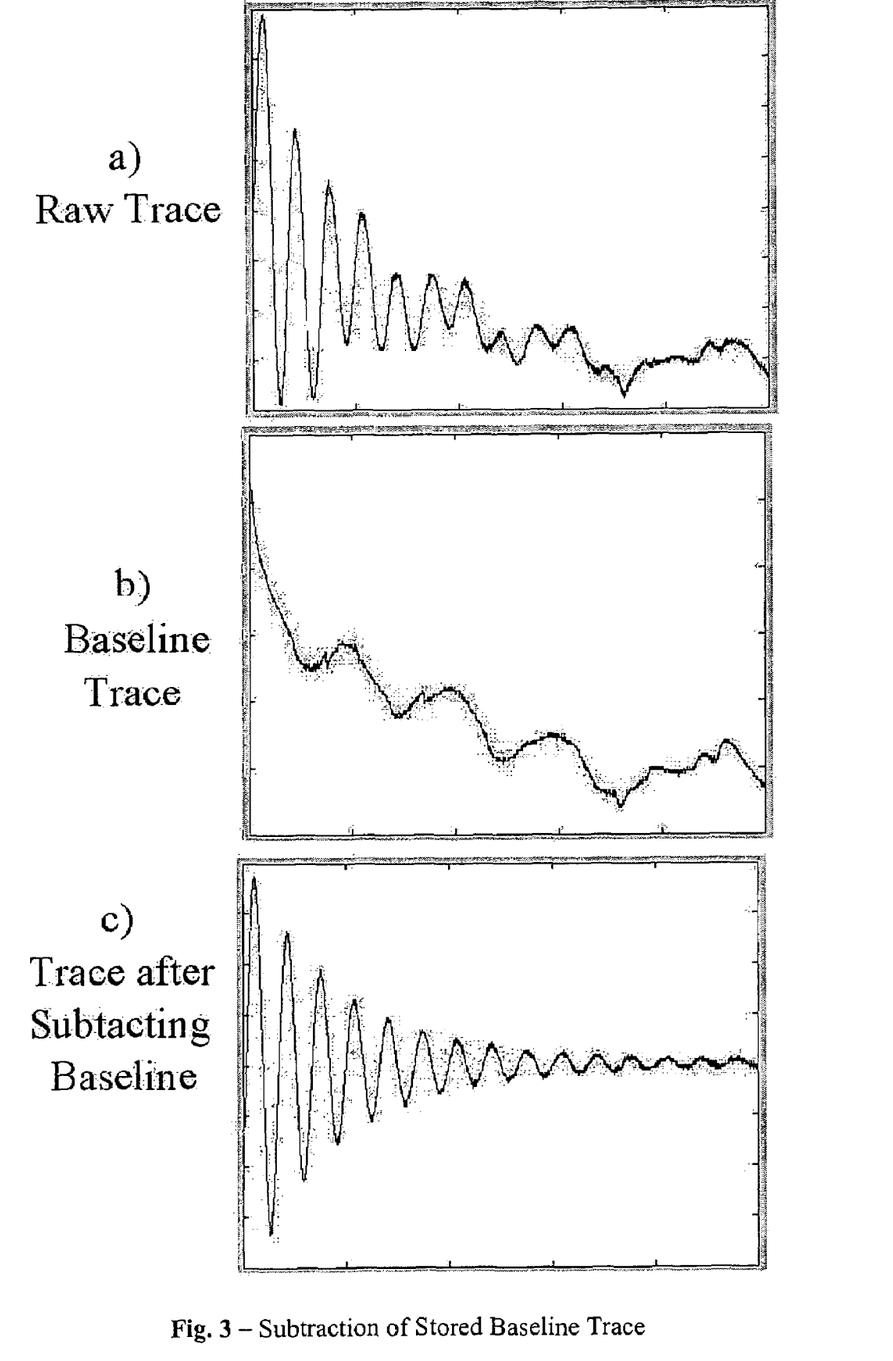
FIG. 3 is a series of three graphs a, b and c showing the steps of Subtraction of Stored Baseline Trace.

A portion of the transmitted signal leaks into the receiver due to the small mismatch between the balance impedance $Z_B$ and the characteristic impedance of the line under test. This obscures the measurement of the weak return signals that form the trace. In our embodiment of the invention, an accurately terminated uniform transmission line of the appropriate gauge is connected and a baseline trace is measured and stored. The raw trace from the line under test as illustrated in FIG. 3a is corrected by subtracting the stored trace illustrated in FIG. 3b to yield the reflected signal trace as illustrated in FIG. 3c.

Part c)

Since the hybrid coupler does not have transformer coupling, it can operate at very low frequencies and can be used for measurements in the 300-3300 Hz voice band. For measurements in this range, additional components would be required in the balance impedance in order to accurately to match the line impedance at these low frequencies.

Measurements in this frequency range can be separately processed as described in patent application #2004-0062361 to observe resonances indicating the number of loading coils (but not their location).

Part d)

Propagation velocity on a telephone line varies with frequency, and is substantially slower at low frequencies. A single point of reflection results in a decaying sinusoid trace which has shorter period at lower measurement frequencies. This variation in period will affect distance resolution when the FFT is applied to the trace. For this reason, we compensate for the variable propagation velocity by warping the frequency axis of the trace.

Each measurement frequency (cycles/sec) along the horizontal axis of the trace, is multiplied by the inverse propagation velocity (sec/meter), or warping function as we call it, and the result is inverse wavelength (cycles/meter). In this way we convert the frequency axis to inverse wavelength so when we apply the Fourier transform, the horizontal axis of the result is in meters. This can be compared to the traditional inverse Fourier transform that transforms a function versus frequency (cycles/sec) to a function versus time (seconds). Since the Fourier transform converts the warped trace from cycles/meter to meters, the distances to the transmission line irregularities correspond to peaks in the spectral analysis.

Figure 4:
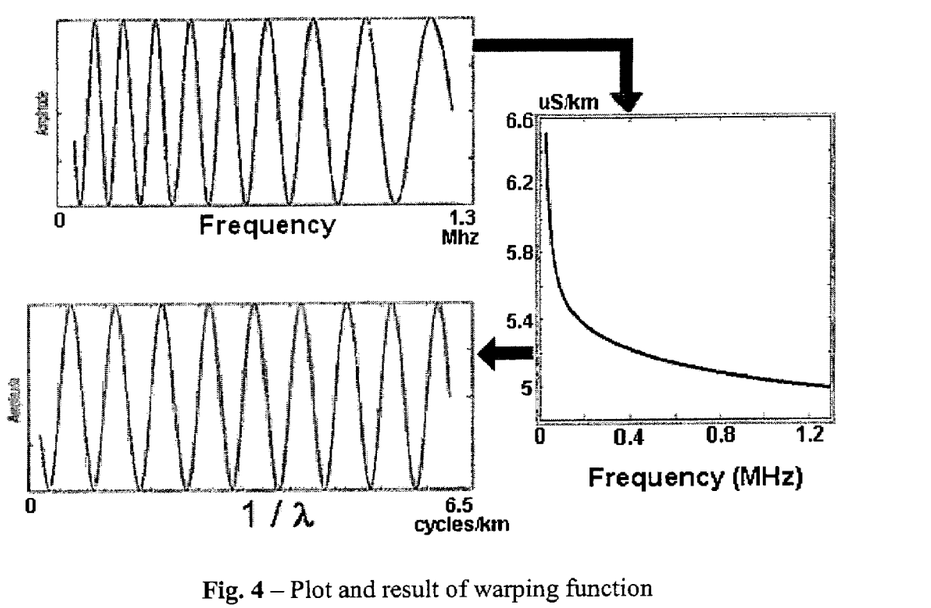
FIG. 4 is a graph showing the Plot and result of warping function.

To calculate the warping function, we begin with the well-known transmission line phase constant (rad/meter) and divide by radian frequency (rad/sec) to obtain inverse propagation velocity (sec/meter). A plot of the warping function is shown in FIG. 4 and expressions for the phase constant and warping function X are given below.

$$\beta(\omega) = \sqrt{\frac{1}{2}\left[\sqrt{(r^2 + \omega^2 l^2)(g^2 + \omega^2 c^2)} - rg + \omega^2 lc\right]}, X(\omega) = \frac{\beta(\omega)}{\omega}.$$

Figure 5:
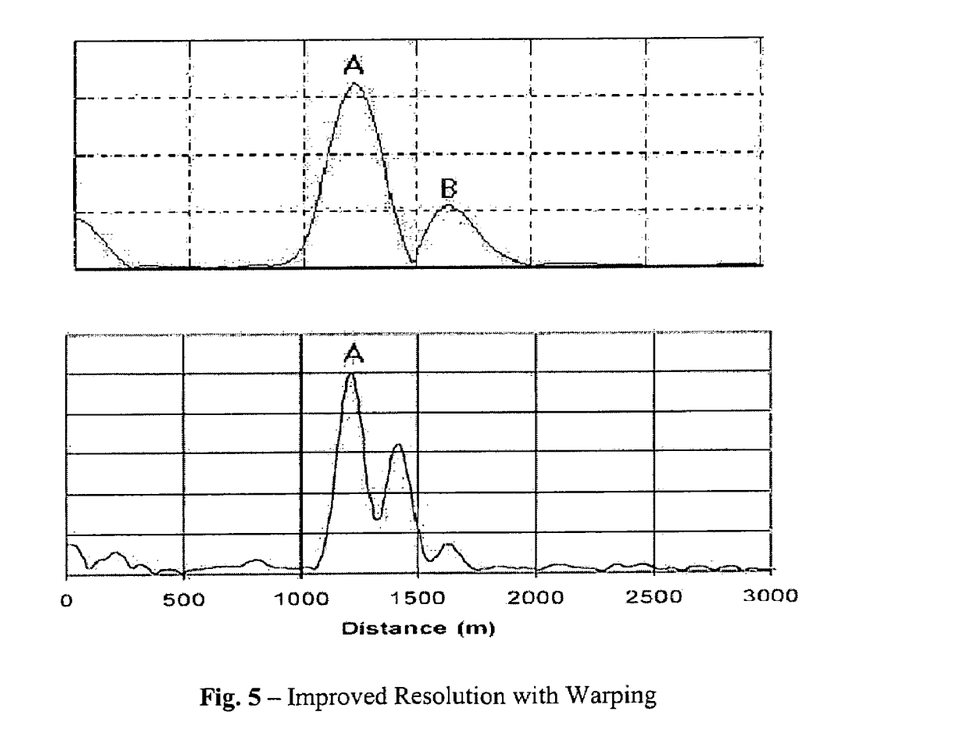
FIG. 5 is a graph showing Improved Resolution with Warping.

An example of the effect of warping the frequency axis is shown in FIG. 5. A bridged tap located at 1200 meters and of length 400 meters is analyzed without frequency warping. The reflection A at the joint and reflection B off the end of the bridge tap are clearly visible. In the second example, the bridge tap length is reduced to 200 meters and the warping function is applied to the trace data. The reflection A is resolved much more clearly and how the reflection from the shorter bridge tap can be discerned.

Part e)

DSL transmission is impaired by discontinuities or faults in the telephone subscriber line. Discontinuities include: bridge taps, loading coils, short circuits, split pairs, open circuit at the end of the line, one wire open circuit, one wire short to ground, and water ingress in the cable. A discontinuity causes a reflection of the test signal and an analysis of these reflections gives information on the structure of the line and the type of discontinuity. The reflection coefficient at each discontinuity is a function of the line impedance, Zo, and the impedance, Zr, at the discontinuity. For the example of a bridge tap, the impedance suddenly reduces by a factor of two since there are two lines in parallel. Both the characteristic impedance and the fault impedance have magnitude and phase angle so the reflection coefficient also has magnitude and phase angle. The reflection coefficient is expressed as:

$$\rho = \frac{Zr - Zo}{Zr + Zo}, \rho = re^{j\theta} = r\angle\theta.$$

The phase angle of the complex reflection coefficient changes with the kind of fault because Zr is different for each type fault. Therefore, by determining the angle of the reflection coefficient, we can estimate the nature of the fault (open circuit, short circuit, loading coil, bridge tap, etc).

Using the W-FDR technique, it is possible to measure reflection coefficient angle. The first step is to extrapolate the trace from the lowest measurement frequency down to 0 Hz. Once the trace is extrapolated we use the FFT to measure the magnitude and phase of each frequency mixed on the trace (each frequency corresponds to one fault) to determine the reflection coefficient angle for each fault in the line.

Figure 6:
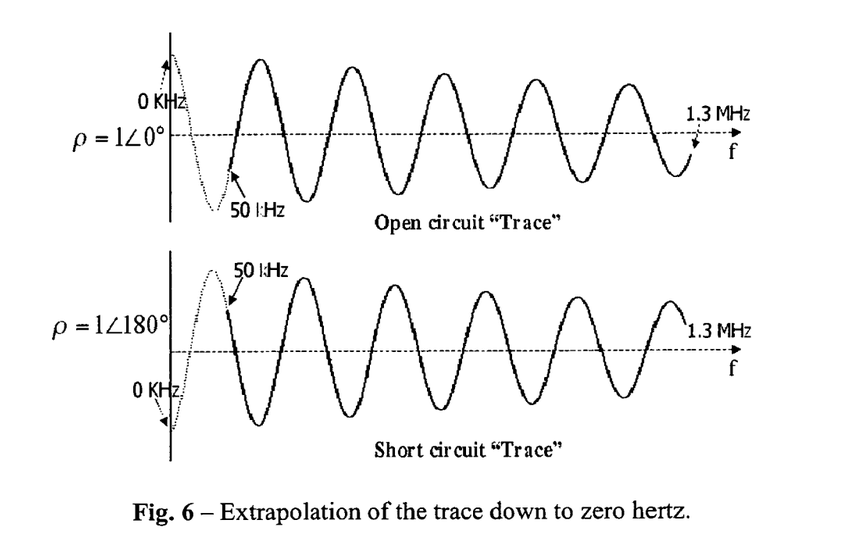
FIG. 6 is a graph showing Extrapolation of the trace down to zero hertz.

As an example, we consider a short line where there is just one fault—an open or short at the end of the line. In FIG. 6, the trace of the reflected signal is measured from 50 kHz to 1.3 MHz. By extrapolating the trace back to zero hertz, we see the reflection coefficient phase angle as 0 degrees for the open circuit and 180 degrees for the short circuit. When using the Fourier transform, this extrapolation is effected by simply pre-pending a series of zero values to the start of the trace. The number of zero samples is calculated with knowledge of the warping function from 50 kHz down to zero hertz.

Part f)

A well-known problem with discrete Fourier transformation of a finite length data record is a result known as "spectral leakage". The discrete Fourier transform treats the data as a cyclic record and if the beginning of the end of record has a different value than the start of the record, we have a discontinuity. This leads to a broad range of spectral components in the output. There are several well-known window functions that can be applied to the trace to reduce "spectral leakage". In general, these diminish the amplitude of the data points at the beginning and end of the record (so as to "taper in and taper out") thereby eliminating the discontinuity. Popular window functions are Hanning, Hamming and Blackman.

Figure 7:
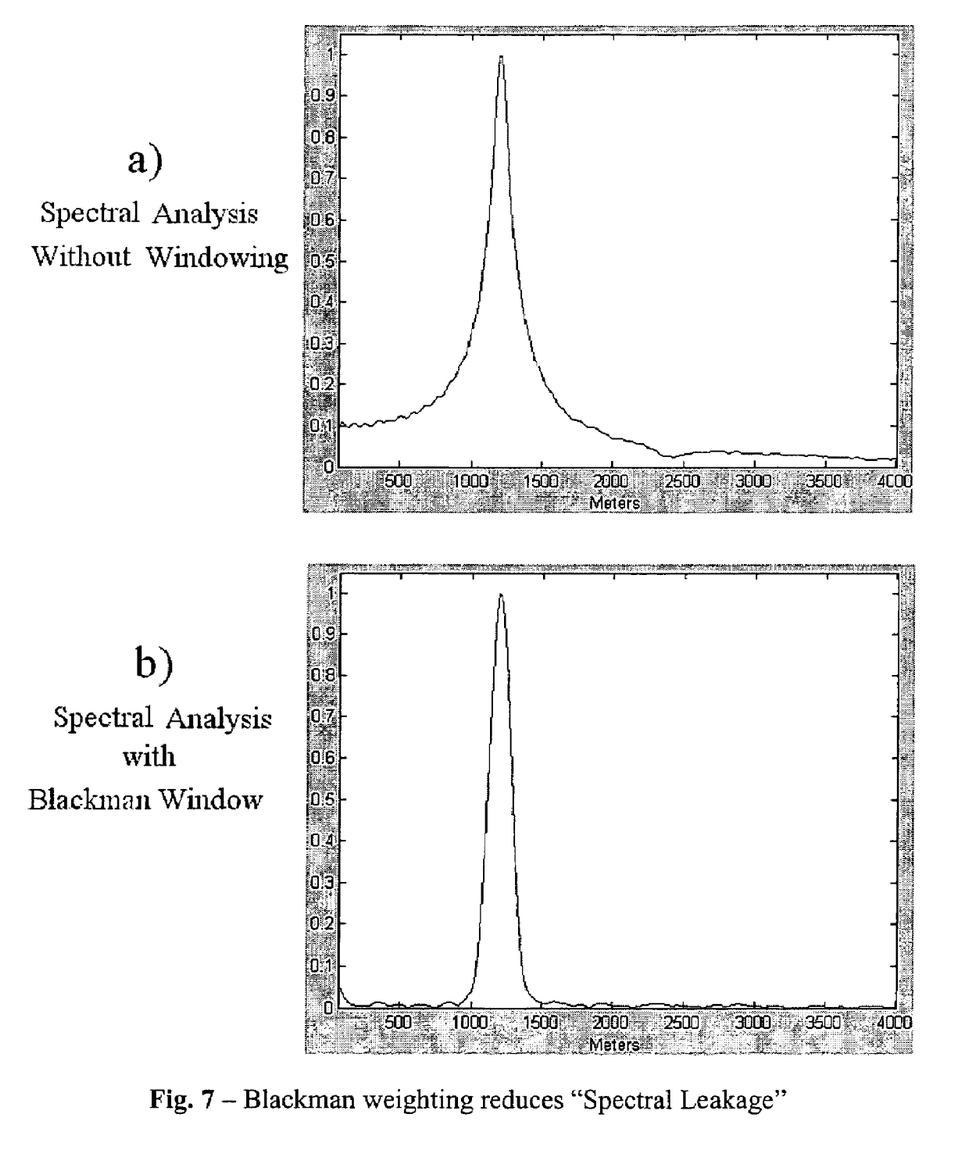
FIG. 7 is a pair of graphs a and b showing the process in which Blackman weighting reduces "Spectral Leakage".

For processing of the trace, the Blackman window was chosen to minimize spurious results at distances where no reflections exist, however, a penalty for is some loss in resolution in the spectral (distance) domain. For the single reflection example case shown in FIG. 7, there are almost no spurious responses at distances other than 1200 meters when the Blackman window is used. On the other hand, this results in a slight broadening of the spectral peak.

Part g)

Figure 8:
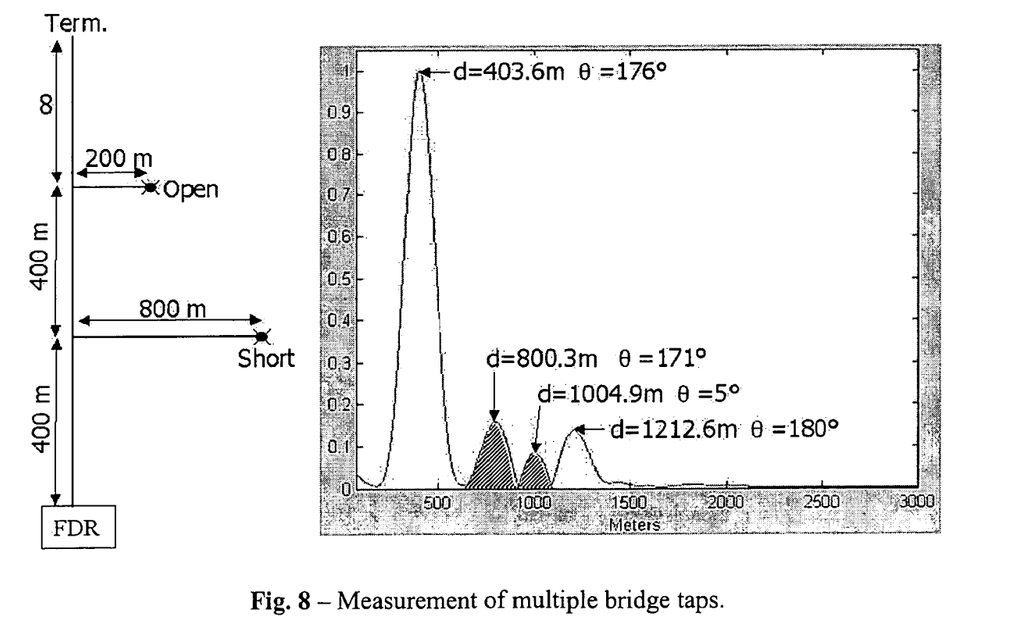
FIG. 8 is a series of four illustrations showing a) multiple bridge taps on a line, b) the measured trace from the line, c) the spectral analysis of the trace showing measured phase angles and distances and d) spectral output with amplification to compensate for increased line attenuation with increasing distance.
Figures 8A, 8B, 8C:
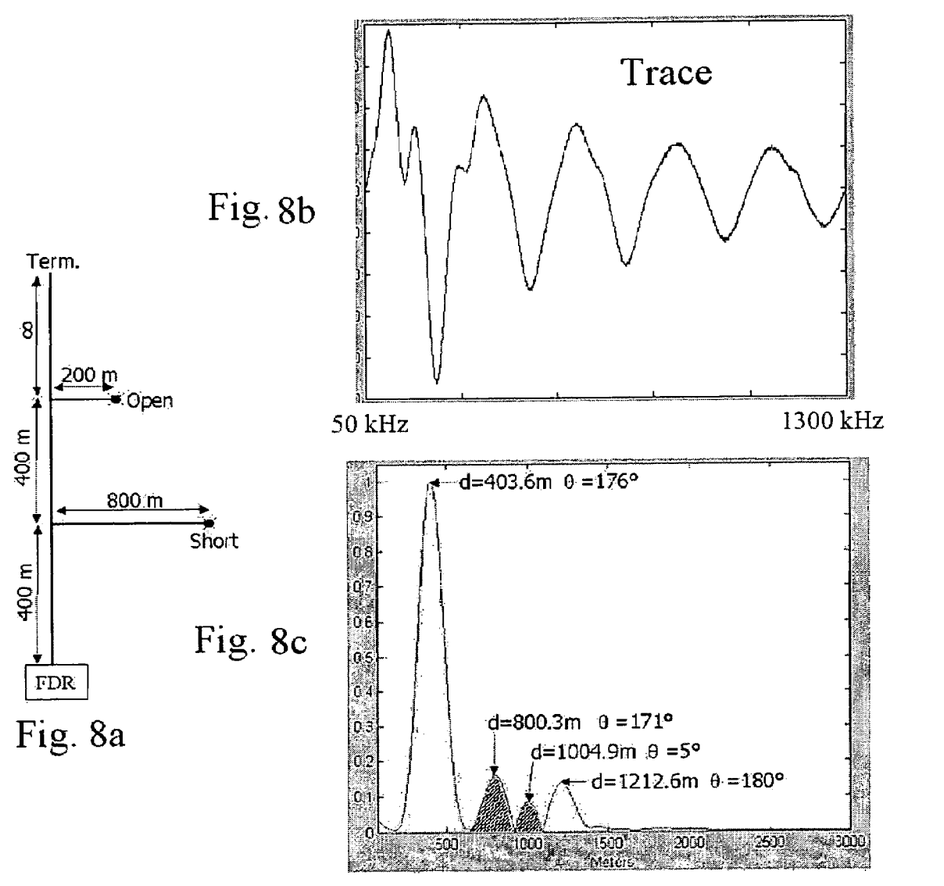

Multiple irregularities or faults in the transmission line result in multiple reflections and these superimpose to create a complicated trace. As an example we consider the transmission line illustrated in FIG. 8a which has two bridged taps, the first one having short circuit end and the second having open circuit end. FIG. 8b illustrates the trace of the reflected signal measured from 50 kHz to 1.3 MHz. FIG. 8c is the spectral analysis of the trace and it shows one reflection from the 800 meter bridge tap—then two (shaded) reflections, one from the joint for the 200 meter bridge tap and one from the end of that bridge tap and finally the fourth reflection form the end of the 800 meter bridged tap. The distances and phase angles of the reflection factors have been obtained from the Fourier transform of the extrapolated trace. Since telephone cable has high loss, reflections from distant points are significantly attenuated.

Part h)

As mentioned previously, the trace amplitude decreases at higher measurement frequencies because the transmission line has higher attenuation at higher frequency. Also, as the distance to the reflection point is increased, the reflection travels through more transmission line and suffers greater loss. The loss is then the product of the loss per kilometer times the number of kilometers to the reflection and consequently, the exponential decay is more rapid for distant reflections. Rapid decay shortens and distorts the trace and this broadens the distance indicating peaks making it difficult to distinguish closely spaced reflections.

For the purpose of increasing resolution over a relatively small range of distances, we apply an exponentially increasing amplification to the trace wherein the rate of increase with frequency is proportional to the distance range being evaluated. This provides a uniform amplitude of oscillation throughout the trace for the components relating to reflections within the range of distances under study. To further increase resolution within this range, a rectangular weighting window (rather than a Blackman window) is used. For this measurement, it is intended that the user ignore the nulls and side lobes that are a result of the rectangular window.

In a variation of this method, the spectral outputs for each range of distance are combined or blended to provide a spectral output with increased resolution throughout the complete range of distance. The length of the transmission line is divided into two or more ranges and the exponentially increasing gain coefficient is selected for each range such that there is uniform amplitude of oscillation for components of the trace relating to reflections within that distance range. For each of the two or more exponentially amplified traces, the Fourier transform is used to provide a spectral output. Use of a weighting window is optional. The two or more spectral outputs are then blended to form a single spectral output where the blending ratios are adapted with distance to favor the spectral output relating to that distance. Thus a spectral peak corresponding to a short distance will be determined mostly by the trace with the least exponential gain and the spectral peak corresponding to the furthest distance will be determined mostly by the trace with the largest exponential gain Part i)

For the purpose of increasing resolution, the trace data can be mirrored about the zero Hz axis providing a longer trace and narrower peaks in the spectral (distance) domain. If we consider the cosine function which is symmetric (or even) about the zero Hz axis, it is clear that mirroring is only applicable to components of the trace that have a positive or negative peak at zero Hz. Fortunately, this includes typical subscriber line reflections that result from bridged taps, short circuits, open circuits and gauge changes. Due to higher frequency attenuation, the mirrored trace is already tapered at the two ends and a tapering window is not necessarily required.

Part j)

Figure 8D:
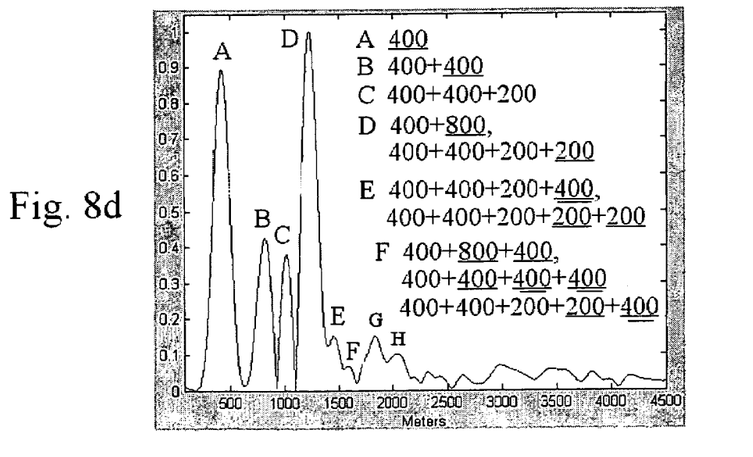

For the purpose of presenting a more understandable result, the spectral output can be amplified in proportion to distance to compensate for loss in the transmission line. Again referring to the example of FIG. 8c, the first and last reflections could be approximately the same amplitude, however, due to loss in the cable, the last reflection is much smaller. As an aid to interpreting the result, the spectral output can be equalized by compensating for transmission line loss. A result of this compensation is shown in FIG. 8d and, in addition to the main peaks A, B, C, and D, smaller peaks at E, F, G, and H, are observed and these correspond to secondary reflections within the line.

The peak marked E is an example of these secondary reflections and it is instructive to follow the signal path through the transmission line. The applied signal travels through the first 400 meter section and passes through the first joint and continues with ⅔ of the original amplitude. The signal passes through the second joint (⅔) and then reflects off the end of the 200 meter bridge tap with gain +1. The signal then passes through the second joint (⅔) again and travels over the 400 meter section towards the source. A portion of the signal returning to the source is reflected from the first joint (−⅓) then reflected back from the second joint (⅓) and finally passes through the first joint (⅔) and back to the source. As indicated in FIG. 8d, this is one of two signal paths resulting in peak E. In the path descriptions, the sections are identified for only one direction of travel. Sections with a negative reflection at one end are indicated by an underline. Sections with negative reflections at both ends are indicated with an double underline. Both signal paths corresponding to peak E are positive so the two reflected signals reach the receiver with the same polarity and they add.

Another visual aid is to present component power in the spectral output rather than amplitude as shown in the illustrations presented here. The amplitude squaring operation minimizes the smaller outputs and allows the user to focus on the main reflections. When the previously mentioned compensation for transmission line loss is applied, distant reflections remain visible.

Since various modifications can be made in our invention as herein above described, and many apparently widely different embodiments of same made within the spirit and scope of the Claims without department from such spirit and scope, it is intended that all matter contained in the accompanying specification shall be interpreted as illustrative only and not in a limiting sense.

The invention claimed is:

1. A method for analyzing irregularities on a transmission line comprising:
    inputting into one end of the transmission line a sinusoidal signal varied over a range of frequencies;
    separating a reflected return signal from the transmitted signal;
    and measuring the portion of the reflected signal that is in-phase with the transmitted signal as a function of frequency applied at said one end to form a trace,
    where the reflected signal is separated from the transmit signal through a doubly balanced hybrid coupler;
    and where the in-phase component of the reflected signal is extracted by a mixer;
    and where the Fourier transform is used to generate a spectral analysis of the measured in-phase return signal versus frequency;
    and where distances to the irregularities are estimated from the spectral position of peaks in the spectral analysis.

2. The method according to claim 1 where the hybrid coupler is first connected to an ideal, terminated line to record a residual in-phase return signal measurement that results from small imbalances in the hybrid coupler and where this residual measurement is subtracted form all further measurements with that hybrid coupler.

3. The method according to claim 1 where the magnitude of each irregularity is estimated from the magnitude of the corresponding spectral peak.

4. A method for analyzing irregularities on a transmission line comprising:
inputting into one end of the transmission line a sinusoidal signal varied over a range of frequencies;
separating a reflected return signal from the transmitted signal;
and measuring the portion of the reflected signal that is in-phase with the transmitted signal as a function of frequency applied at said one end to form a trace,
compensating the result based on the propagation velocity in the line to yield a measurement of in-phase reflection amplitude as a function of inverse wavelength;
and using the Fourier transform to generate a spectral analysis of the compensated measurement where the positions of peaks in the spectral analysis are used to estimate the distances to irregularities.

5. The method according to claim 4 where the magnitude of each irregularity is estimated from the magnitude of the corresponding spectral peak.

6. A method for analyzing irregularities on a transmission line comprising:
inputting into one end of the transmission line a sinusoidal signal varied over a range of frequencies;
separating a reflected return signal from the transmitted signal;
and measuring the portion of the reflected signal that is in-phase with the transmitted signal as a function of frequency applied at said one end to form a trace,
where measured results are extrapolated from the lowest frequency of measurement downward to zero Hz;
and then using the Fourier transform to generate a spectral analysis of the extrapolated measurement;
and using the positions of peaks in the spectral analysis to estimate the distances to irregularities;
and using the phase angles in the spectral analysis to estimate the phase angle in the reflections;
and using the phase angle to thus estimate the nature of the irregularity that caused the reflection.

7. The method according to claim 6 where the magnitude of each irregularity is estimated from the magnitude of the corresponding spectral peak.

8. A method for analyzing irregularities on a transmission line comprising:
inputting into one end of the transmission line a sinusoidal signal varied over a range of frequencies;
separating a reflected return signal from the transmitted signal;
and measuring the portion of the reflected signal that is in-phase with the transmitted signal as a function of frequency applied at said one end to form a trace,
and then using the Fourier transform to generate a spectral analysis of the measurement;
and using the positions of peaks in the spectral analysis to estimate the distances to irregularities;
and, to compensate for attenuation that increases with measurement frequency, gain is applied to the trace that increases exponentially with frequency as is appropriate to the line length to closely spaced irregularities so that, when using the Fourier transform in un-windowed mode to generate a spectral analysis, high resolution is attained over the distance range of the closely spaced irregularities.

9. The method according to claim 8 where the magnitude of each reflection is estimated from the magnitude of the corresponding spectral peak.

10. The method according to claim 8 where the phase angle of each reflection is estimated from the phase angle of the corresponding spectral peak.

11. A method for analyzing irregularities on a transmission line comprising:
inputting into one end of the transmission line a sinusoidal signal varied over a range of frequencies;
separating a reflected return signal from the transmitted signal;
and measuring the portion of the reflected signal that is in-phase with the transmitted signal as a function of frequency applied at said one end to form a trace,
and then using the Fourier transform to generate a spectral analysis of the measurement;
and using the positions of peaks in the spectral analysis to estimate the distances to irregularities;
and, to compensate for attenuation that increases with measurement frequency, gain is applied to the trace that increases exponentially with frequency as is appropriate to the length of a section of line where the line length is divided into two or more sections and using the Fourier transform to generate a spectral analysis for each compensated trace corresponding to each section of the line length and combining the two or more spectral outputs into a single spectral output where the combining is a blend of the two or more spectral outputs and where the blending ratios are adapted with distance in the spectral output.

12. The method according to claim 11 where the magnitude of each reflection is estimated from the magnitude of the corresponding spectral peak.

13. The method according to claim 11 where the phase angle of each reflection is estimated from the phase angle of the corresponding spectral peak.

14. A method for analyzing irregularities on a transmission line comprising:
inputting into one end of the transmission line a sinusoidal signal varied over a range of frequencies;
separating a reflected return signal from the transmitted signal;
and measuring the portion of the reflected signal that is in-phase with the transmitted signal as a function of frequency applied at said one end to form a trace,
and then using the Fourier transform to generate a spectral analysis of the measurement;
and using the positions of peaks in the spectral analysis to estimate the distances to irregularities;
and, to improve resolution when using the Fourier transform, the reflected signal measurement is first extrapolated to zero hertz and then a reversed version of the extrapolated measurement is pre-pended to the extrapolated measurement so that the length of the extrapolated measurement is increased in length by a factor of two and thereby improves the resolution of the spectral output.

15. The method according to claim 14 where the magnitude of each reflection is estimated from the magnitude of the corresponding spectral peak.

* * * * *